Patented Feb. 7, 1939

2,146,209

UNITED STATES PATENT OFFICE 2,146,209

PREPARATION OF RESINOUS IMIDES OF SUBSTITUTED ACRYLIC ACIDS

George De Witt Graves, Wilmington, Del., assignor to E. I. du Pont de Nemours & Company, Wilmington, Del., a corporation of Delaware No Drawing. Application July 31, 1936, Serial No. 93,720

9 Claims. (Cl. 260—2)

This invention relates to synthetic resins, more particularly to resinous polyacrylic acid imides and N-substituted imides, and still more particularly to a process for making polymethacrylimide and N-substituted polymethacrylimides.

It is an object of this invention to provide a new and improved process for the preparation of polyimides of acrylic and alpha-hydrocarbon substituted acrylic acids. A further object is to provide new and useful polyimides of acrylic and alpha-hydrocarbon substituted acrylic acids. A still further object is to provide a new, simple, and inexpensive process for making a series of polyacrylimides. Other objects will appear hereinafter.

These objects are accomplished by the following invention which comprises heating a polymeric acid or ester of the acrylic series at a suitable temperature with an amino compound of the type $R(NH_2)_x$ (R being hydrogen or a hydrocarbon radical, and $x$ being a small whole number), or with a substance capable of liberating such an amino compound, and isolating the resinous reaction product. The reaction may be carried out either in the presence or absence of a suitable solvent.

According to this invention, the polyacrylic acid or polymeric acrylic acid ester, the amino compound and the solvent or diluent (if any) are placed in a reaction vessel and the mixture is heated at about 140°–200° C. for several hours. The course of the reaction can be followed to some extent by observing changes in solubility of the polymer. After heating, the reaction mixture is cooled and, if desired, treated to remove unreacted constituents and high-boiling solvent. It may, for example, be extracted several times with a solvent in which the polyimide is insoluble and in which any unreacted amino compound is soluble, or it may be dissolved in a suitable solvent and be then precipitated therefrom by addition of a non-solvent. In some cases, the unreacted amine may be removed by distillation in vacuo. The residual mass or the precipitate, as the case may be, is dried in air or at elevated temperatures, as preferred.

In the practice of this invention I may use polymeric acrylic and alpha-hydrocarbon substituted acrylic acids and their esters. In their monomeric form these compounds may be represented by the following structural type formula:

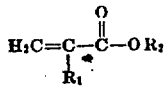

wherein $R_1$ and $R_2$ may be hydrogen or hydrocarbon radicals selected from the class consisting of alkyl (e. g. methyl, ethyl, butyl, etc.) aryl, e. g. phenyl, aralkyl, e. g. benzyl, and alicyclic radicals, e. g. cyclopentyl, cyclohexyl.

The amino compounds which can be used in this invention may be represented by the formula $R(NH_2)_x$, where R is hydrogen, alkyl or alkenyl (having 1 to 18 or more carbon atoms, e. g., methyl, ethyl, dodecyl, hexadecyl, octadecyl, or 9,10-octadecenyl), carbocyclic, e. g., cyclohexyl, phenyl, and benzyl, and $x$ is a small whole number. Certain substances which liberate such amino compounds under the conditions used in this invention, or which provide the desired amino groups, may also be used instead of the free amino compounds themselves. Certain ureas, for example, can be used as sources of the desired amino groups. Urea itself yields ammonia when strongly heated or when hydrolyzed in accordance with the equations:

$$CO(NH_2)_2 \rightarrow NH_3 + HNCO$$

$$CO(NH_2)_2 + H_2O \rightarrow CO_2 + 2NH_3$$

By analogy, sym-di-substituted ureas may be considered as yielding primary amines. Mono-substituted ureas would yield mixtures of primary amines and ammonia. In some cases, the amine hydrohalides may be used instead of the free amines.

In the practice of this invention I may use compounds of the type

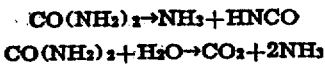

where $R_1$ and $R_2$ may both be hydrogen or alkyl, cycloalkyl, aryl, or aralkyl, or where $R_1$ may be hydrogen and $R_2$ alkyl, cycloalkyl, aryl, or aralkyl, and where $R_3$ may be oxygen or sulfur. By the expression, a urea is meant compounds such as urea itself, methyl urea, s-dicyclohexyl urea, and s-didodecyl urea.

I may also use guanidine and substituted guanidines of the type

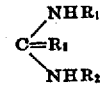

($R_1$, $R_2$, and $R_3$ being hydrogen, alkyl, cycloalkyl, aralkyl or aryl), in place of urea. It is better to use them in combination with a solvent since their melting points are usually not well defined and since some of them melt with decomposition. The products obtained by heating the guanidines with polyacrylic acids or esters are mixtures of imides or N-substituted imides of polyacrylic acids with organic by-products.

Suitable solvents or diluents for the reaction mixtures are diethylene glycol, ethylene glycol, xylene, diphenyl, etc., depending on the nature of the reactants. In many cases, the amino compound to be reacted with the polyacrylic acid serves as the solvent, especially when a considerable excess of amine is used. When a urea is used in my process, I may carry out the reaction without the aid of a solvent, provided the melting point of the urea does not exceed about 200° C. and that stirring can be done efficiently enough to insure thorough mixing and uniform heating throughout the course of the reaction. When the urea melts above about 200° C., it is better to use it in conjunction with a solvent. We may likewise use a free amine, either in conjunction with or in the absence of a solvent.

The reaction products of this invention vary in their properties from white, brittle solids to fairly soft, elastic resins which can be formed into flexible, transparent films, depending upon the polyacrylic acid and the amino compound employed. Polymethacrylimide, for example, is hard and brittle, while N-octadecyl polymethacrylimide is flexible and tough. It is thus feasible to prepare a series of polyimides and N-substituted polyimides varying in their properties to almost any desired degree of hardness, toughness and flexibility, depending upon the character of the reactants employed.

The invention may be illustrated by the following examples, in which polymethacrylic acid, polymeric methyl methacrylate, and polymeric methyl acrylate are used as representative of the more widely utilized polyacrylic acids and esters, but which may be replaced by other polyacids and polyesters of the acrylic series.

EXAMPLE I

Preparation of polymethacrylimide

An intimate mixture of 34 grams (0.4 mol) of polymethacrylic acid and 24 grams (0.4 mol) of urea was heated, with stirring, in a small flask in an oil bath at 150° C. After a short time the reaction mixture collected on the stirrer as a spongy mass. The product at this time was soluble in water and insoluble in methanol. One hundred (100) cubic centimeters of diethylene glycol were added as a diluent and the reaction was continued with stirring for a total of two and one-half hours, the temperature of the oil bath being about 150° C. At this time, a viscous amber mass was obtained which was poured into an open vessel and extracted three times with boiling methanol. This was done by boiling the entire mixture for fifteen to thirty minutes each time with at least an equal volume of methanol. The final product was a nearly white solid which was somewhat porous and spongy when wet with hot methanol, and which was insoluble in methanol and water. Analysis of the dried product showed that it contained 8.71% nitrogen, compared with a theoretical nitrogen content of 9.1%, thus indicating that the product was essentially polymethacrylimide. It was soluble in formamide, diethylene glycol, dilute aqueous alkali and dilute ammonia. The resin was precipitated from alkaline solutions by acidification. Clear but somewhat brittle films could be flowed from the aqueous alkaline solutions and such films could be rendered water-insoluble by dipping them into an acid solution. Tough films were obtained by adding a little diethylene glycol to the alkaline solutions before casting. Films flowed from the ammonium hydroxide solutions became substantially insoluble in water on baking twenty to thirty minutes at 100° C.

Polymer prepared as described above was found especially useful as a "granulating agent" for the granular polymerization of acrylic and alpha-hydrocarbon substituted acrylic acid esters, etc., as described in copending applications of Crawford et al., Serial No. 749,500 filed October 22, 1934, and D. E. Strain, Serial No. 15,668 filed April 10, 1935.

The polymethacrylimide can be modified by treatment with aldehydes. For example, a portion of this polymer and an excess of 37% aqueous formaldehyde were heated together on a water bath for thirty minutes at about 90° C., sufficient sodium hydroxide solution being added to dissolve the polyimide. Upon evaporating the solution and heating the dry polymer a few minutes at 100° C., it was found that the product was only slightly soluble in alkaline solutions. When the formaldehyde-treated solution was acidified with hydrochloric acid, the polymer precipitated and became alkali-insoluble when the mixture was boiled for a few minutes.

EXAMPLE II

Preparation of polymethacrylimide

A mixture of 20 grams (0.23 mol) of polymethacrylic acid and 40 grams (0.67 mol) of urea was heated, with stirring, in an oil bath at 150°–160° C. until most of the reaction mixture collected on the stirrer. The stirrer was then removed, and the reaction mixture was heated for an additional two and one half hours at 150°–160° C. After cooling, the reaction product was extracted three times with boiling methanol. The product was similar to that of Example I, except that it was more nearly white and dissolved in dilute ammonium hydroxide and caustic solutions a little more slowly.

The preparation of N-substituted polyimides is illustrated in the following examples.

EXAMPLE III

Preparation of N-butyl polymethacrylimide

A mixture of 1 mol of sym-di-N-butyl urea and 1 mol of polymethacrylic acid was heated at approximately 150° C. for three hours, as described in Example II. The resulting resin was purified by precipitation from toluene solution by addition of benzine. On drying, a hard, light-colored resin was obtained, soluble in toluene and acetone, but insoluble in water and alkali solutions.

Symmetrical-di-N-butyl urea may be made by reacting N-butyl amine with phosgene.

EXAMPLE IV

Preparation of N-dodecyl polymethacrylimide

A mixture of 55 grams of dodecylamine, 50 grams of polymeric methyl methacrylate and 100 grams of diphenyl (as solvent) was heated at about 200° C. for about eight hours in a flask equipped with a reflux condenser. The product was thrice dissolved in ethyl acetate and precipitated therefrom with benzine. Films cast from an ethyl acetate solution of the resulting resin and dried at 80° C. for twenty-four hours were rigid, but when plasticized with about 16% dibutyl phthalate (i. e., 16 grams of dibutyl phthalate and 84 grams of the resin), the films were very flexible, fairly tough and slightly elastic, and had good slip and feel after aging a few days at room temperature. The unmodified resin molded at 130° C. to a tough chip. The softening point of the molded chip was 80° C. The resin could easily be cold-drawn to form filaments. Analysis indicated that the product was 50.5% N-dodecyl polymethacrylimide by weight, and that 38% of the carboxyl groups in the polymethacrylic acid had reacted with the amine to form N-dodecyl polymethacrylimide.

EXAMPLE V

*Preparation of N-cetyl polymethacrylimide*

A mixture of 70 grams of cetyl amine, 50 grams of polymeric methyl methacrylate, and 100 grams of diphenyl was heated as in Example IV on an oil bath at about 200° C. for twenty hours. Methanol was liberated during this period and could be seen refluxing in the condenser at about 66° C. The reaction product was cooled, dissolved in a mixture of toluene, ethyl acetate and gasoline, and precipitated therefrom with methanol, this purification being repeated twice. The precipitated product was air dried and then dried at 80° C. for twenty-four hours. A yield of 61 grams of a white, resinous product was obtained, which on analysis was found to contain 68.8% by weight of the desired polyimide. The product is suitable for molding or for casting transparent, flexible, tough films.

EXAMPLE VI

*Preparation of N-octadecyl polymethacrylimide*

Twenty (20) grams of octadecylamine and 20 grams of polymeric methyl methacrylate were heated at 200° C. for six hours with 40 grams of diphenyl in a 200 cc. flask equipped with a stirrer and an air condenser. The product was dissolved in hot acetone and precipitated therefrom with 95% ethanol. The precipitate was then dissolved in toluene, reprecipitated with ethanol, and dried at 80° C. for forty-eight hours. Analysis indicated that the product was 67.2% N-octadecyl polymethacrylimide by weight. That is, the product was a complex in which approximately 50 mol per cent of the original polymeric ester was converted to the polyimide. Unsupported films of this product cast from toluene solutions were clear, transparent, tough, and elastic.

EXAMPLE VII

*Preparation of N-butyl polymethacrylimide*

Polymethacrylic acid was stirred with sufficient substantially anhydrous N-butylamine to give a smooth homogeneous gel, and the mixture was heated at 190°-210° C. for three hours. At first, excess butylamine distilled off, and later water was also liberated. A hard, brittle, high-softening resin was produced. Analysis indicated that it was 88% by weight N-butyl polymethacrylimide and 12% polymethacrylic acid. The resin was soluble in toluene, acetone, and hot 95% ethanol. It was insoluble in benzine (aliphatic hydrocarbons), water, and cold ethanol. This product is useful for molding.

EXAMPLE VIII

*Preparation of N-octadecyl polyacrylimide*

Example VI was repeated, using polymeric methyl acrylate instead of the polymeric methyl methacrylate. The product was a pliable, elastic resin having solubility characteristics similar to those of the corresponding polymethacrylimide described in Example VI.

EXAMPLE IX

*Preparation of N-dodecyl polymethacrylimide*

A mixture of 100 grams of dodecylamine, 50 grams of polymeric methyl methacrylate and 1 gram of water (as catalyst) was heated under an air condenser at 200°-210° C. for about fifteen hours. The cooled resinous product was soluble in benzine, ether and hot dioxan, but was insoluble in hot acetone or ethanol, or in cold dioxan. By dissolving it in hot dioxan and precipitating it therefrom by pouring the solution into a mixture of 60% water, 36% methanol and 4% acetic acid, a tough, fibrous resin was obtained, which upon analysis was found to contain 3.76% nitrogen (indicating that the polymer was 86.5% polyimide). Cast films of the resin were tough and elastic. The resin molded at about 90° C. to a tough, flexible chip.

The proportions of amino compound to polymeric acid or ester can be varied over any desired limits. Excess of the amine does no harm and may, in many cases, be useful as a solvent or diluent for the reaction mixture. When a urea is utilized as the source of the amine, it should be used in sufficient proportions to liberate the desired amino compound in the quantities in which it would be employed were it used instead of the urea. Theoretically, at least ¼ mol of the urea per mol of the acid considered as monomer is required for complete conversion of the polyacrylic acid to the imide, but in practice it is better to use larger proportions of the urea, as illustrated in the examples. Excess urea, moreover, acts as a flux for the reaction mixture although it does not generally dissolve the polyacrylic acid or the polyimides which form during the reaction. By using less urea or amine than is required for complete conversion of the polyacrylic acid or ester to the polyimide, the properties of the final products can be varied, in that the ratio of imide to acid or imide to ester groups in the polymer may be altered. It will be clear from these considerations that no rigid limits can be set governing the relative ratios of amine or urea and polyacids or polyesters to be employed.

In place of the polyacrylic acid or the polymeric acrylic ester, I may use copolymers obtained by polymerizing monomeric acrylic acids or their esters in admixture with each other. For example, two or more acrylic acids, two or more acrylic esters or one or more acrylic acids and one or more acrylic esters, may be interpolymerized to form polymers which may be used instead of polymeric acids or esters alone. By varying the amounts of such constituents and by varying the amine or urea, products of varied solubility and almost any degree of flexibility, hardness or toughness may be obtained. Acidic substances such as those produced by polymerizing monomeric acrylic acids or esters in the presence of maleic anhydride, fumaric acid, etc., may be substituted in part or in whole for the polyacrylic acids alone. Novel products with unique properties are also obtained when the original polymeric acrylic acid derivative is modified with long chain ester groups such as stearyl esters (which may be introduced by interpolymerizing, for example, stearyl methacrylate and methacrylic acid), which, being difficult to hydrolyze, remain in the finished polyimide resin and, hence, modify its properties.

It is feasible in any of the examples to substitute polymeric acrylic acid esters such as polymeric methyl methacrylate for the polymeric acrylic acids themselves, and vice versa. For example, polymeric imides of acids of the general formula

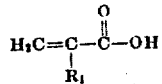

wherein $R_1$ may be hydrogen or a hydrocarbon radical selected from this class of alkyl, aryl, aralkyl, and alicyclic radicals may be produced by reacting the polyacrylic esters with substances such as sym-octadecyl urea at relatively high temperatures (e. g., 180°–200° C.). These reactions may be conducted in the absence of solvents, or solvents, diluents or viscosity-reducing agents such as dioxan, xylene, diphenyl or chlorobenzene may be added to the reaction mixture.

It will be understood that I may use mixtures of amino compounds and/or ureas in combination with any of the polyacid or polyester combinations enumerated above. In like manner, I may use polyamines, e. g., ethylene diamine, hexamethylene diamine, triethylene tetramine, etc., as part or total substitutes for the monoamines or urea, etc., of the examples. Mixtures of polyacrylic acids or polyacrylic esters or any of the aforementioned interpolymers may be used instead of the single polymers.

The duration of the reaction period can be varied from a few minutes to several hours. The nature of the reaction products obtained will vary to some extent with the duration of the reaction period. Longer heating usually insures a somewhat better yield of imide. Any of the reactions can be conducted either at superatmospheric or subatmospheric pressures, if desired.

Reaction temperatures may be varied over wide limits, depending upon the other reacting conditions such as presence or absence of a solvent or diluent, the boiling point of the amine, or the melting point of the urea employed (when no solvent is used). When a urea is used in the absence of a solvent or diluent for the reactants, the temperature should be at least slightly above its melting point. For example, with urea itself the reaction temperature should be at least 132° C. and preferably 10°–20° higher. Some ureas such as s-diphenyl urea have excessively high melting points (235° C.) and are not particularly suitable for use in this invention without a solvent. However, they can be reacted satisfactorily in the presence of a suitable liquid in which they are soluble. On the other hand, some ureas melt at relatively low temperatures, e. g., s-dimethyl urea melts at about 102° C. and may be reacted with polymethacrylic acid at this temperature, although it is better to use temperatures 20°–30° C. higher. It may be stated as a general but by no means an inflexible rule that ureas melting below 200° C. can be used satisfactorily without a solvent, while those melting above 200° C. should be reacted in the presence of a solvent.

When the free amino compounds are used, substantially the same reaction temperatures may be used as would be employed with the corresponding urea. Temperatures of 150°–200° C. are generally satisfactory when free amines are used. It may be necessary to heat the more volatile amines with the polyacrylic acids or esters under superatmospheric pressures. Since this is often inconvenient, it is better in preparing unsubstituted polyimides or substituted polyimides containing short chain alkyl groups on the imido nitrogen, to use an appropriate urea (because of its low volatility) instead of the amine. For example, polymethacrylimide itself is more easily prepared from urea than from ammonia. Similarly, N-methyl polymethacrylimide is more conveniently made from sym-dimethyl urea than from methylamine.

While good resins can be prepared by using any alicyclic, aliphatic or mixed amines or ammonia, those amines which have a long aliphatic chain, e. g., from 12 to 18 carbon atoms, result in resins which form flexible films. The resins prepared from amines containing short chains may be cast into fairly good flexible films if a suitable plasticizer is used.

The resinous products of this invention are useful, either alone or in conjunction with softeners or plasticizers, oils, waxes, cellulose derivatives, other resins, dyes, pigments, etc., for coating and/or sizing all sorts of surfaces, e. g., wood, metals, glass, stone, brick, concrete, paper, textile fabrics, etc. They are also useful as ingredients of coating compositions for textiles, paper, etc., or for adhesives such as safety glass interlayers. They are also useful as dispersing agents. Unsupported films (foils or pellicles) of certain of the polyimides, particularly the more flexible polyimides described herein, or polyimides which have been plasticized or blended with other ingredients to render them tougher and more flexible, are also useful as wrappings, food containers, etc. (i. e., as substitutes for sheets of transparent regenerated cellulose, cellulose acetate, etc.).

While I have described certain important and specific applications of the invention, yet it will be understood that modifications and variations can be made without departing from its spirit and scope as set forth in the appended claims.

I claim:

1. An imide of a polymeric alpha-hydrocarbon substituted acrylic acid having an aliphatic hydrocarbon radical of from 12 to 18 carbon atoms attached to the nitrogen atom.

2. The dodecyl imide of polymethacrylic acid.

3. The octadecyl imide of polymethacrylic acid.

4. In the process of preparing resinous imides from a polymer of a compound of the general formula

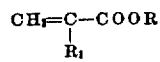

wherein R and $R_1$ are members of the group consisting of hydrogen and hydrocarbon radicals, the step which comprises heating said compound at a temperature between 140° C. and about 250° C. with a compound selected from the class of ammonia, primary amines, and compounds capable of liberating ammonia, or primary amines upon decomposition under the reaction conditions.

5. The process set forth in claim 4 wherein the reaction is carried out in the presence of a solvent.

6. The process which comprises heating a polymer of a compound of the formula

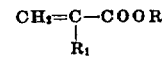

wherein R and $R_1$ are members of the group consisting of hydrogen and hydrocarbon radicals, at a temperature between 140° C. and about 250° C., with a compound of the general formula

wherein X is a member of the group consisting of O, S and NR, and in which R, R₂ and R₃ are members of the group consisting of hydrogen and hydrocarbon radicals.

7. In the process of preparing resinous imides from a polymer of a compound of the general formula $$CH_2=C-COOR$$
$$\quad\quad |$$
$$\quad\quad R_1$$

wherein R and R₁ are members of the group consisting of hydrogen and hydrocarbon radicals, the step which comprises heating said compound with a compound of the formula RNH₂ in which R is a member of the group consisting of hydrogen and hydrocarbon radicals at a temperature about 140° C. and about 200° C.

8. In the process of preparing resinous imides from a polymer of a compound of the general formula $$CH_2=C-COOR$$
$$\quad\quad |$$
$$\quad\quad R_1$$

wherein R and R₁ are members of the group consisting of hydrogen and hydrocarbon radicals, the step which comprises heating said compound at a temperature between 140° C. and about 250° C. with a compound selected from the class of ammonia, primary amines, and compounds capable of liberating ammonia, or primary amines upon decomposition under the reaction conditions, and modifying the resinous imide produced by reacting the same with an aldehyde.

9. An aldehyde modified imide of a polymeric alpha-hydrocarbon substituted acrylic acid having an aliphatic hydrocarbon radical of from 12 to 18 carbon atoms attached to the nitrogen atom.

GEORGE DE WITT GRAVES.

CERTIFICATE OF CORRECTION.

Patent No. 2,146,209.                          February 7, 1939.

GEORGE DE WITT GRAVES.

It is hereby certified that error appears in the printed specification of the above numbered patent requiring correction as follows: Page 5, first column, line 18, claim 7, after the word "temperature" insert between; and that the said Letters Patent should be read with this correction therein that the same may conform to the record of the case in the Patent Office.

Signed and sealed this 11th day of April, A. D. 1939.

(Seal)                                        Henry Van Arsdale
                                                    Acting Commissioner of Patents.

wherein X is a member of the group consisting of O, S and NR, and in which R, R₂ and R₃ are members of the group consisting of hydrogen and hydrocarbon radicals.

7. In the process of preparing resinous imides from a polymer of a compound of the general formula $$CH_2=C-COOR$$
$$\phantom{CH_2=C-}|$$
$$\phantom{CH_2=C}R_1$$

wherein R and R₁ are members of the group consisting of hydrogen and hydrocarbon radicals, the step which comprises heating said compound with a compound of the formula RNH₂ in which R is a member of the group consisting of hydrogen and hydrocarbon radicals at a temperature about 140° C. and about 200° C.

8. In the process of preparing resinous imides from a polymer of a compound of the general formula $$CH_2=C-COOR$$
$$\phantom{CH_2=C-}|$$
$$\phantom{CH_2=C}R_1$$

wherein R and R₁ are members of the group consisting of hydrogen and hydrocarbon radicals, the step which comprises heating said compound at a temperature between 140° C. and about 250° C. with a compound selected from the class of ammonia, primary amines, and compounds capable of liberating ammonia, or primary amines upon decomposition under the reaction conditions, and modifying the resinous imide produced by reacting the same with an aldehyde.

9. An aldehyde modified imide of a polymeric alpha-hydrocarbon substituted acrylic acid having an aliphatic hydrocarbon radical of from 12 to 18 carbon atoms attached to the nitrogen atom.

GEORGE DE WITT GRAVES.

CERTIFICATE OF CORRECTION.

Patent No. 2,146,209.  February 7, 1939.

GEORGE DE WITT GRAVES.

It is hereby certified that error appears in the printed specification of the above numbered patent requiring correction as follows: Page 5, first column, line 18, claim 7, after the word "temperature" insert between; and that the said Letters Patent should be read with this correction therein that the same may conform to the record of the case in the Patent Office.

Signed and sealed this 11th day of April, A. D. 1939.

(Seal)

Henry Van Arsdale
Acting Commissioner of Patents.